US006386430B1

(12) United States Patent
Prommate et al.

(10) Patent No.: US 6,386,430 B1
(45) Date of Patent: May 14, 2002

(54) MECHANISM FOR PROPERLY SIZING A CLAMP TO FIT WITH STRIPS OF A PLURALITY OF IC PACKAGE SIZES

(75) Inventors: Wanus Prommate, Pathumtani; Narong Bokkaew, Tak; Grid Kachane, Nakorn Sri Thammaratj, all of (TH)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/661,772

(22) Filed: Sep. 14, 2000

(51) Int. Cl.[7] .................................................. B23K 5/22
(52) U.S. Cl. ....................................... 228/212; 228/103
(58) Field of Search ................................ 228/212, 213, 228/103, 4.1, 44.3, 44.7

(56) References Cited

U.S. PATENT DOCUMENTS 5,343,628 A * 9/1994 Ham
5,904,867 A * 5/1999 Herke
5,983,427 A * 11/1999 Igei

* cited by examiner

*Primary Examiner*—M. Alexandra Elve
*Assistant Examiner*—Jonathan Johnson
(74) *Attorney, Agent, or Firm*—Monica H. Choi

(57) ABSTRACT

In a system and method for adjusting a height of a base of a clamp to fit to strips of a plurality of IC (integrated circuit) package sizes, the clamp is comprised of a fixed clamp portion and the base having a height that is adjustable with respect to the fixed clamp portion. A bar is disposed over the base of the clamp along a length of the base of the clamp, and the bar is fixed with respect to the fixed clamp portion. Each of a plurality of dummy strips of IC packages corresponds to a respective IC package size. A respective dummy strip of IC packages corresponding to a respective IC package size is placed on the base of the clamp to be supported by the base of the clamp. In addition, a plurality of height adjustment jigs are disposed on the bar to slide along the bar. Each of the height adjustment jigs has a respective size corresponding to a strip of a respective IC package size. A respective height adjustment jig corresponding to the respective IC package size is slid along the bar to be disposed over the respective dummy strip of IC packages. The base of the clamp is raised with respect to the fixed clamp portion toward the respective height adjustment jig until the respective dummy strip of IC packages touches the respective height adjustment jig at a proper height of the base of the clamp. In this manner, the proper height of the base of the clamp is efficiently adjusted by fitting the dummy strip of IC packages between the respective height adjustment jig and the base of the clamp for any of a plurality of sizes of the strip of IC packages.

6 Claims, 5 Drawing Sheets

312 302 314 314 316 318 332 304 334 326 328 206 322 324 204

MECHANISM FOR PROPERLY SIZING A CLAMP TO FIT WITH STRIPS OF A PLURALITY OF IC PACKAGE SIZES

TECHNICAL FIELD

The present invention relates generally to manufacture of IC (integrated circuit) packages, and more particularly, to a mechanism for efficiently ensuring proper adjustment of a height of a base of a clamp for holding strips of a plurality of IC package sizes.

BACKGROUND OF THE INVENTION

The present invention is described for a clamp within an on-loader section of a solder plating machine for soldering leads of IC packages of a strip of IC packages. However, the present invention may be used for clamps in other types of machines for manufacture of IC packages, as would be apparent to one of ordinary skill in the art of IC package manufacture from the description herein.

Referring to FIG. 1, a solder plating machine 100 includes a conveyor 102 that moves through an on-loader section 104, a soldering cell 106, and an off-loader section 108 of the solder plating machine 100. Strips of IC packages are input to the on-loader section 104, and the conveyor 102 picks up such strips of IC packages within the on-loader section 104.

Referring to FIG. 2, a strip of IC packages 110 is comprised of a plurality of IC packages including a first IC package 112, a second IC package 114, and a third IC package 116. A strip of IC packages typically includes more numerous IC packages, but three IC packages 112, 114, and 116 are shown for the strip 110 of FIG. 2 for clarity of illustration. Each of the IC packages 112, 114, and 116 of the strip 110 has leads formed with the conductive surface of the strip 110, as known to one of ordinary skill in the art of IC package manufacture. FIG. 3 shows a side view of the strip of IC packages 110.

During fabrication of IC packages, the conductive surface of the strip 110 forming the leads of the IC packages 112, 114, and 116 is plated with solder within the solder plating machine 100 of FIG. 1 such that the leads of the IC packages are more amenable for wiring to a printed circuit board. Referring to the solder plating machine 100, the conveyor 102 picks up the strips of IC packages from the on-loader section 104 and moves the strips of IC packages through the soldering cell 106 where the conductive surface of the strip 110 forming the leads of the IC packages 112, 114, and 116 is plated with solder.

The conveyor 102 then moves the strips of IC packages to the off-loader section 108 where the strips of IC packages are removed from the conveyor 102 to leave the solder plating machine 100. The IC packages 112, 114, and 116 are then separated from the strip 110, and the leads of the IC packages 112, 114, and 116 are formed from the conductive surface of the strip 110, as known to one of ordinary skill in the art of IC package manufacture. The components 104, 106, and 108 of the solder plating machine 100 are known to one of ordinary skill in the art of IC package manufacture.

Referring to FIG. 4, detailed components of the on-loader section 104 of the solder plating machine 100 include a clamp positioner 202 supporting a fixed clamp portion 204. A base 206 is disposed on the fixed clamp portion 204, and the height of the base 206 is adjustable with respect to the fixed clamp portion 204. An active clamp portion 208 is movable through the fixed clamp portion 204 for holding or releasing a strip of IC packages from the fixed clamp portion 204. The clamp of the on-loader section 104 of the solder plating machine 100 includes the fixed clamp portion 204, the base 206, and the active clamp portion 208. Such components of the on-loader section 104 of the solder plating machine 100 are known to one of ordinary skill in the art of IC package manufacture.

During operation of the on-loader section 104, a vacuum plate 210 with a suction cup 212 holding the strip of IC packages 110 places the strip of IC packages 110 onto the base 206 of the clamp. Technology for vacuum plates with suction cups for holding strips of IC packages is known to one of ordinary skill in the art of IC package manufacture.

Referring to FIGS. 4 and 5, after the strip of IC packages 110 is placed on the base 206 of the clamp, the active clamp portion 208 is moved toward the strip of IC packages 110 such that the strip of IC packages 110 is fixedly held between the fixed clamp portion 204 and the active clamp portion 208. In addition, the base 206 supports the strip of IC packages 110 from the bottom such that the height of the strip of IC packages 110 is determined by the height of the base 206.

Further referring to FIGS. 4 and 5, after the strip of IC packages 110 is fixedly held between the fixed clamp portion 204 and the active clamp portion 208, the clamp moves from the right position on the clamp positioner 202 (as illustrated in FIG. 4) to the left position on the clamp positioner 202 (as illustrated in FIG. 5). In the left position on the clamp positioner 202, the strip of IC packages 110 is aligned to a belt gripper 214 of the conveyor 102 of the solder plating machine 100.

Referring to FIGS. 5 and 6, after the clamp moves to the left position on the clamp positioner 202, the clamp positioner 202 is lifted up toward the belt gripper 214 of the conveyor 102. An elevation stopper 216 stops the lifting of the clamp positioner 202 when the strip of IC packages 110 is positioned inside the belt gripper 214. When the strip of IC packages 110 is within the belt gripper 214, the belt gripper 214 closes to grip the strip of IC packages 110.

Referring to FIGS. 6 and 7, when the belt gripper 214 is holding the strip of IC packages 110, the active clamp portion 208 is moved with respect to the fixed clamp portion 204 to release the strip of IC packages 110. In addition, the clamp positioner 202 moves back down away from the belt gripper 214 of the conveyor 102. The clamp then moves back to the right position of the clamp positioner 202 to repeat the steps for receiving another strip of IC packages to be loaded to another belt gripper of the conveyor 102.

Referring to FIGS. 1 and 7, the belt gripper 214 holding the strip of IC packages 110 is part of the conveyor 102 that moves the strip of IC packages 110 through the soldering cell 106 for plating the conductive surface of the strip 110 forming the leads of the IC packages 112, 114, and 116. The belt gripper 214 of the conveyor 102 then moves the strip of IC packages 110 to the off-loader section 108 for releasing the strip of IC packages 110 from the belt gripper 214 of the conveyor 102.

Such a process of loading a strip of IC packages to the conveyor 102 at the on-loader section 104, plating the conductive surface of the strip of IC packages at the soldering cell 106, and releasing the strip of IC packages from the conveyor 102 at the off-loader section 108 is repeated for a plurality of strips of IC packages during production of IC packages. In addition, such a process is used for solder plating the conductive surface of strips of IC packages for different types of IC packages having different sizes. Each of different strips of IC packages corresponding to different IC package sizes has a unique size.

Referring to FIGS. 4, 5, 6, and 7, for the belt gripper 214 of the conveyor 102 to properly grip the strip of IC packages from the clamp, the strip of IC packages within the clamp should be brought to a proper height with respect to the belt gripper 214 when the clamp positioner 202 is lifted toward the belt gripper 214 (as illustrated in FIG. 6). The height of the base 206 of the clamp is adjusted for controlling the height of the strip of IC packages within the clamp with respect to the belt gripper 214 when the clamp positioner. 202 is lifted toward the belt gripper 214. The height of the base 206 is adjusted to accommodate different sizes of the strip of IC packages for manufacture of different types of IC packages.

FIG. 8 shows a side view of the base 206 and the fixed clamp portion 204 from the left side of the fixed clamp portion 204 in FIGS. 4, 5, 6, and 7. Referring to FIG. 8, in the prior art, the height of the base 206 is adjusted with respect to the fixed clamp portion 204 using metric scales. The left portion of the base 206 is slid along a first guide slot 232 for adjusting the height of the left portion of the base 206, and a right portion of the base 206 is slid along a second guide slot 234 for adjusting the height of the right portion of the base 206.

In addition, the height of the left portion of the base 206 is adjusted with respect to a first metric scale 236, and the height of the right portion of the base 206 is adjusted with respect to a second metric scale 238. Each strip of IC packages for different IC packages sizes has a respective metric scale reading. The heights of the left and right portions of the base 206 are then adjusted to the respective metric scale readings on the first and second metric scales 236 and 238 corresponding to any particular size of strip of IC packages for the proper height of the base 206. The base 206 is then fixed to the fixed clamp portion 204 with a first screw 240 and a second screw 242.

Unfortunately, this prior art mechanism using the metric scales 236 and 238 for adjusting the height of the base 206 for different sizes of strips of IC packages is prone to human error. An operator may use wrong metric scale readings for adjusting the height of the base 206. In addition, an operator may not accurately adjust the height of the base 206 to the proper metric scale readings corresponding to a particular size of the strip of IC packages. Referring to FIG. 6, a wrong height of a strip of IC packages within the clamp of the on-loader section 104 with respect to the belt gripper 214 of the conveyor 102 may result in improper transfer of the strip of IC packages from the clamp to the belt gripper 214 of the conveyor 102.

Thus, a mechanism is desired for efficiently ensuring that the base 206 is adjusted to a proper height with respect to the fixed clamp portion 204 for different sizes of strips of IC packages for manufacture of different types of IC packages.

SUMMARY OF THE INVENTION

Accordingly, in a general aspect of the present invention, a mechanism includes a plurality of height adjustment jigs disposed over the base of the clamp for fitting a strip of IC packages between an respective height adjustment jig and the base of the clamp to determine the proper height of the base for different sizes of strips of IC packages.

In one embodiment of the present invention, in a system and method for adjusting a height of a base of a clamp to fit to strips of a plurality of IC (integrated circuit) package sizes, the clamp is comprised of a fixed clamp portion and the base having a height that is adjustable with respect to the fixed clamp portion. A bar is disposed over the base of the clamp along a length of the base of the clamp, and the bar is fixed with respect to the fixed clamp portion. Each of a plurality of dummy strips of IC packages corresponds to a respective IC package size. A respective dummy strip of IC packages corresponding to a respective IC package size is placed on the base of the clamp to be supported by the base of the clamp.

In addition, a plurality of height adjustment jigs are disposed on the bar to slide along the bar. Each of the height adjustment jigs has a respective size corresponding to a strip of a respective IC package size. A respective height adjustment jig corresponding to the respective IC package size is slid along the bar to be disposed over the respective dummy strip of IC packages. The base of the clamp is raised with respect to the fixed clamp portion toward the respective height adjustment jig until the respective dummy strip of IC packages touches the respective height adjustment jig at a proper height of the base of the clamp.

The present invention may be used to particular advantage when a proper height for a plurality of locations along the length of the base of the clamp is adjusted by sliding the respective height adjustment jig along the bar to each of the plurality of locations along the length of the base until the respective dummy strip of IC packages touches the respective height adjustment jig at each of the plurality of locations along the length of the base.

In this manner, the proper height of the base of the clamp is efficiently adjusted by fitting the dummy strip of IC packages between the respective height adjustment jig and the base of the clamp for any of a plurality of sizes of the strip of IC packages. Metric scales of the prior art which are prone to human error are not used with the present invention when setting the proper height of the base for the plurality of sizes of the strip of IC packages.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1, 2, 3, 4, 5, 6, 7, 8, 9, 10, and 11 refer to elements having similar structure and function.

DETAILED DESCRIPTION

Figure 1:
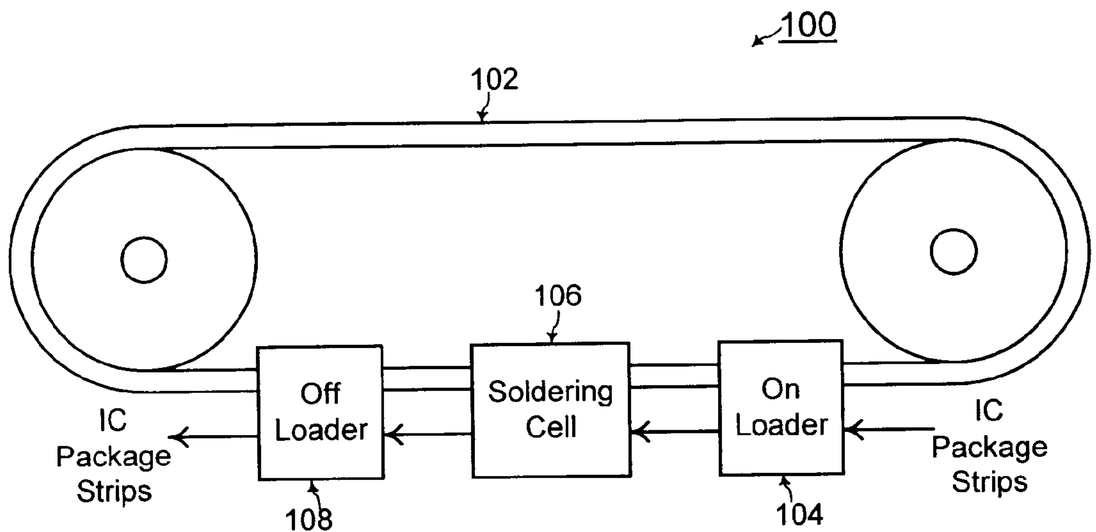
FIG. 1 shows the general components of a solder plating machine for plating solder onto a conductive surface comprising the leads of a strip of IC packages.
Figure 2:
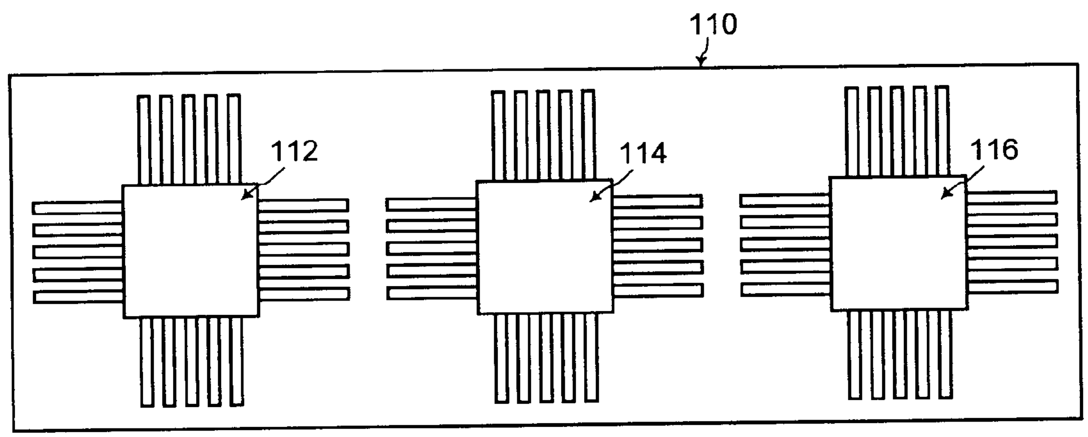
FIG. 2 shows a top view of an example strip of IC packages having a conductive surface comprising the leads of the IC packages.
Figure 3:
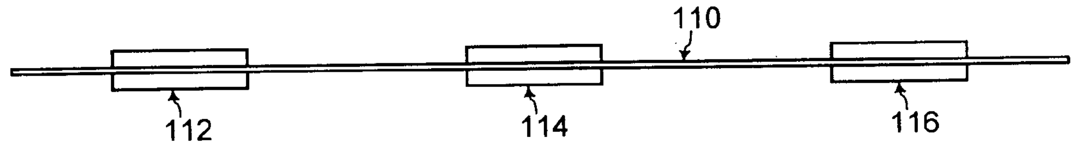
FIG. 3 shows a side view of the example strip of IC packages of FIG. 2.
Figure 4:
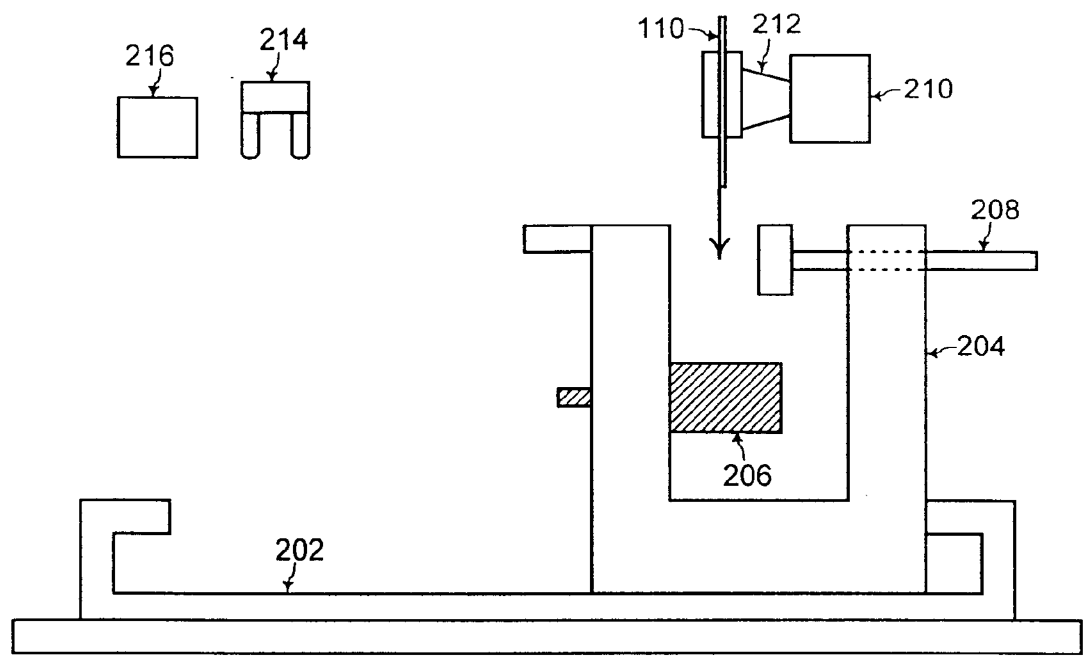
FIGS. 4, 5, 6, and 7 illustrate the operation of the components of the on-loader section of the solder plating machine of FIG. 1 for transferring a strip of IC packages from a clamp to a belt gripper of the conveyor of the solder plating machine.
Figure 5:
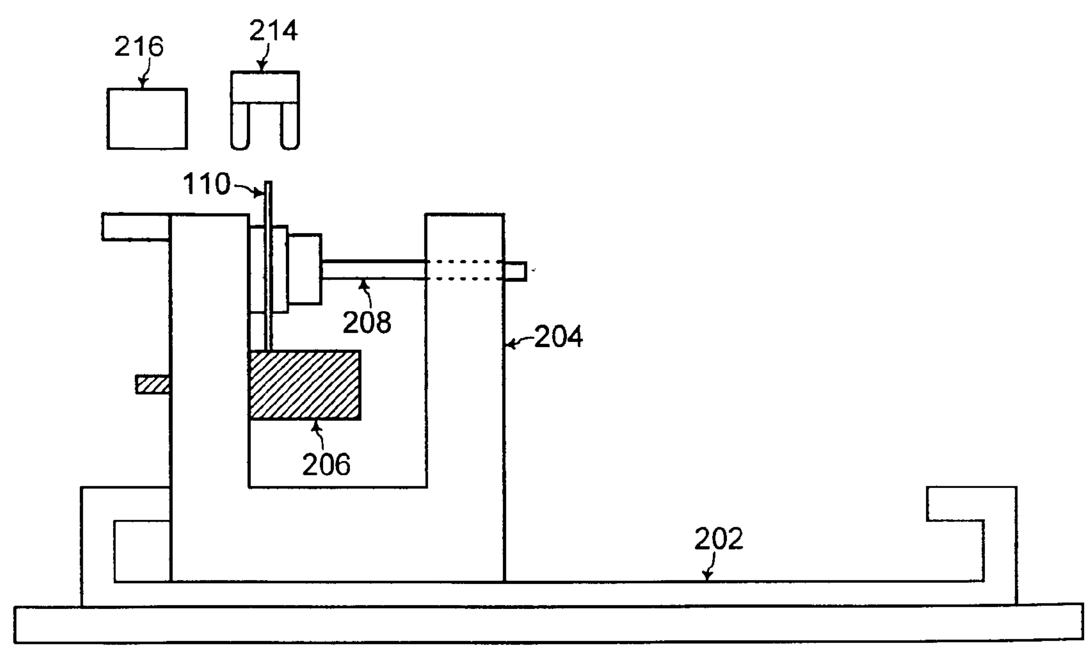
Figure 6:
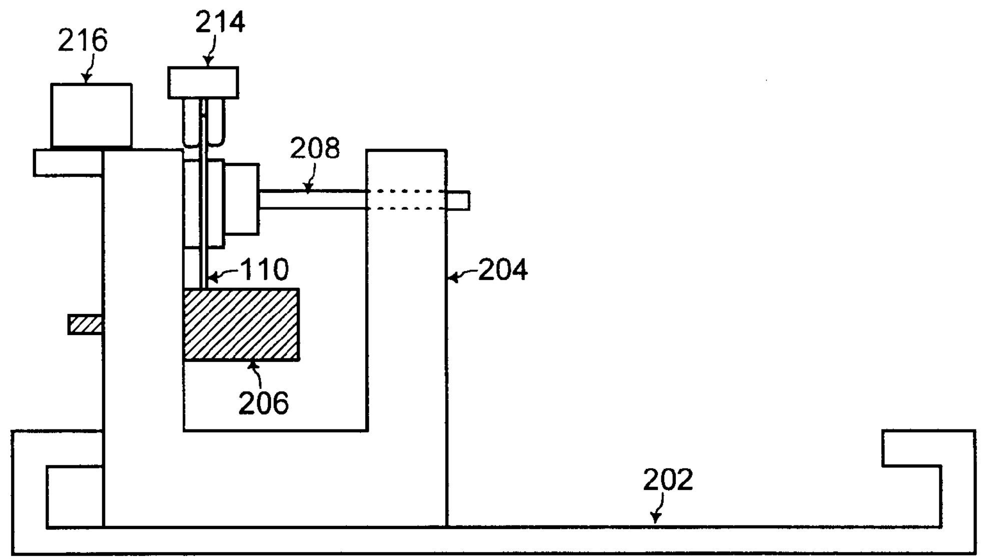
Figure 7:
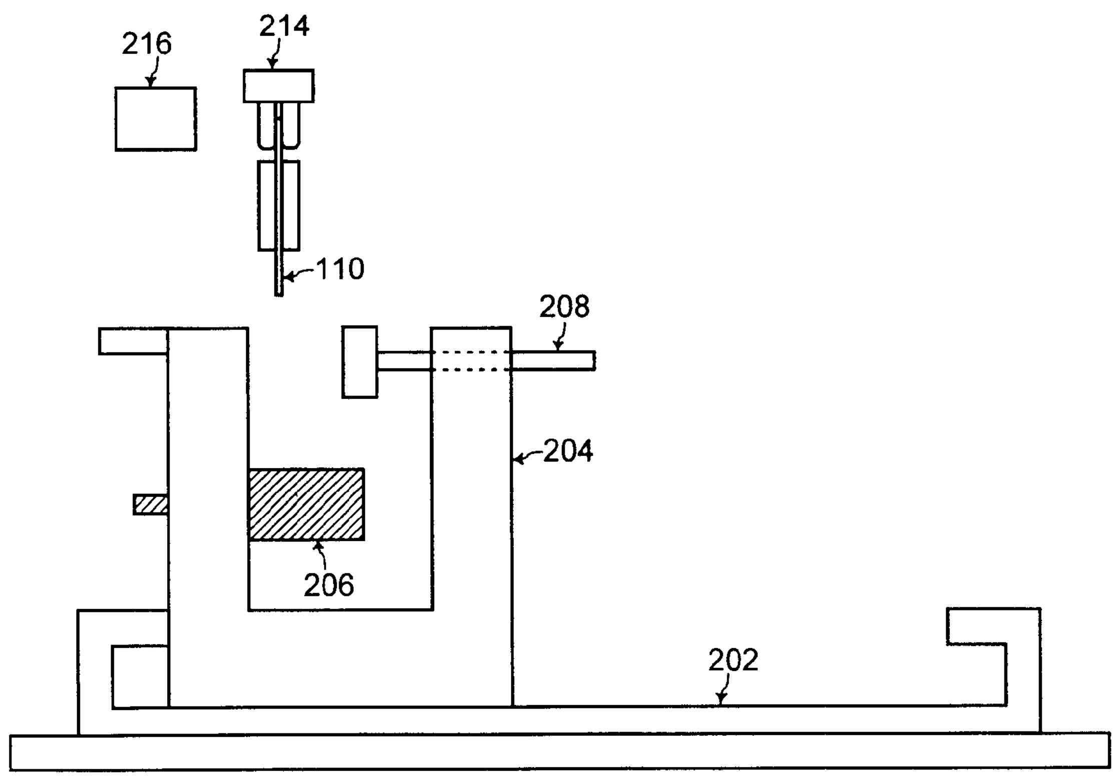
Figure 8:
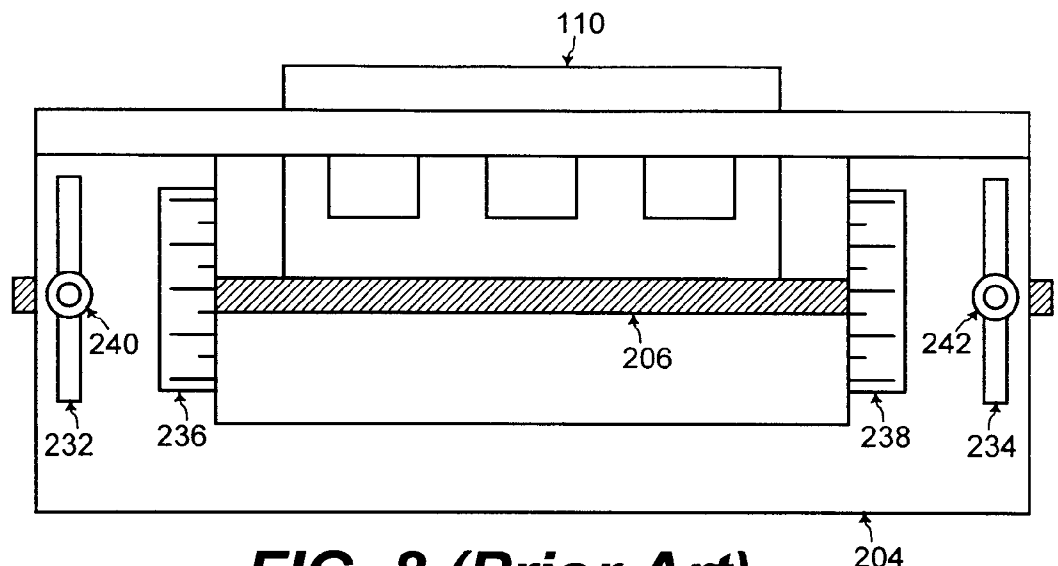
FIG. 8 illustrates using metric scales for adjusting the height of a base of the clamp of the on-loader section of the solder plating machine of FIG. 1 for different sizes of strips of IC packages, according to the prior art.
Figure 9:
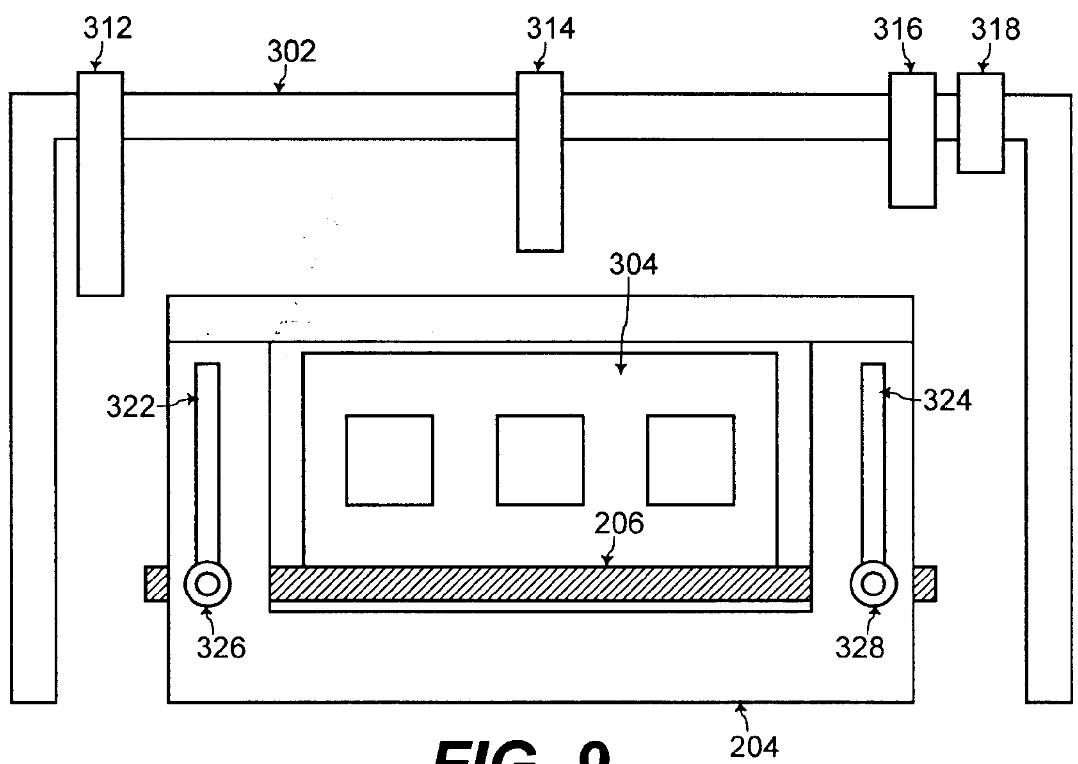
FIGS. 9, 10, and 11 illustrate the use of a plurality of height adjustment jigs disposed over the base of the clamp for fitting a strip of IC packages between an respective height adjustment jig and the base of the clamp to determine the proper height of the base for different sizes of strips of IC packages, according to an aspect of the present invention.

Referring to FIG. 9, for efficiently adjusting the base 206 of the clamp with respect to the fixed clamp portion 204, a bar 302 is disposed over the base 206 of the clamp along the length of the base of the clamp (as illustrated in FIG. 9). The position of the bar 302 is fixed with respect to the fixed clamp portion 204.

A dummy strip of IC packages 304 having the same size as a particular strip of IC packages is placed on the base 206 of the clamp to be supported by the base 206. A plurality of dummy strips of IC packages are used with each dummy strip of IC packages having a respective size of a corresponding strip of IC packages for different sizes of strips of IC packages.

A plurality of height adjustment jigs including a first height adjustment jig 312, a second height adjustment jig 314, a third height adjustment jig 316, and a fourth height adjustment jig 318 are disposed on the bar 302 to slide along the bar 302. Each of the height adjustment jigs 312, 314, 316, and 318 has a respective size corresponding to a particular size of a strip of IC packages. A respective height adjustment jig (i.e. the second height adjustment jig 314 in FIG. 9) corresponding to the dummy strip of IC packages 304 is slid along the bar 302 to be disposed over the dummy strip of IC packages 304.

Figure 10:
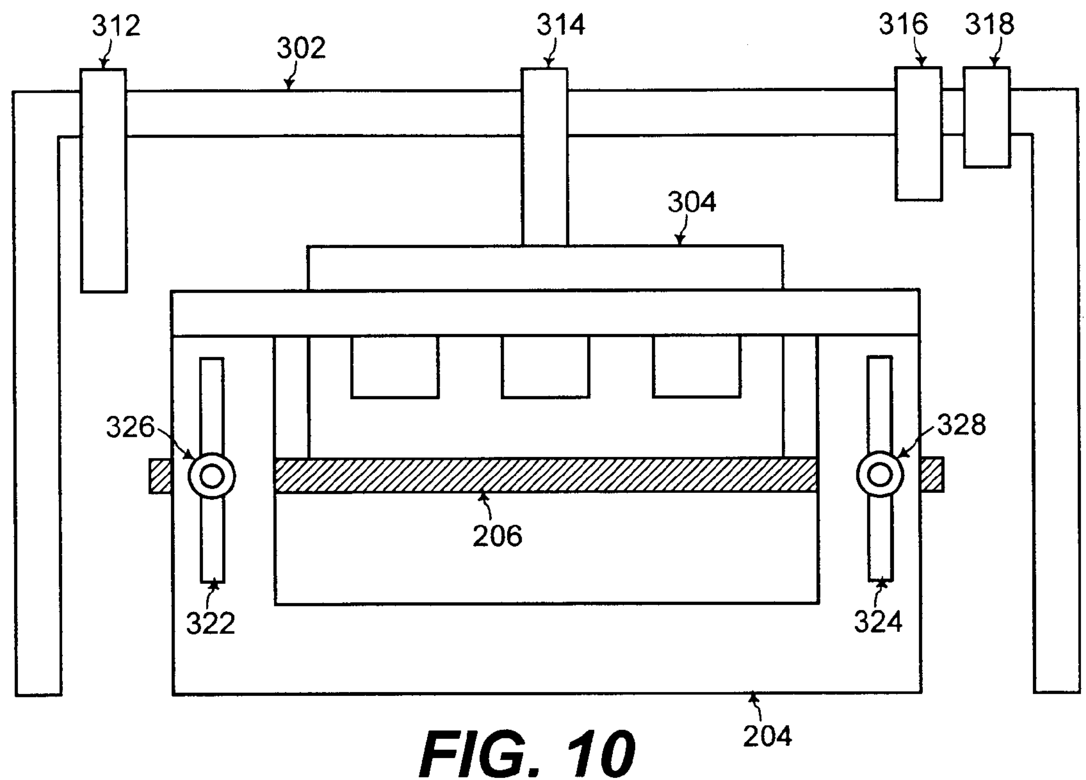

Referring to FIGS. 9 and 10, when the dummy strip of IC packages 304 has been placed on the base 206 of the clamp to be supported by the base 206, and when the respective height adjustment jig 314 corresponding to the dummy strip of IC packages 304 is placed over the dummy strip of IC packages 304, the base 206 with the dummy strip of IC packages 304 thereon is raised toward the respective height adjustment jig 314. The respective height adjustment jig 314 and the dummy strip of IC packages 304 correspond to a particular size of a strip of IC packages for manufacture of a particular type of IC packages.

Referring to FIG. 10, the base 206 of the clamp with the dummy strip of IC packages 304 thereon is raised toward the respective height adjustment jig 314 until the dummy strip of IC packages 304 touches the respective height adjustment jig 314 at a proper height of the base 206 of the clamp. The left portion of the base 206 slides along a first guide slot 322, and a right portion of the base 206 slides along a second guide slot 324 as the height of the base 206 is adjusted. The first and second guide slots 322 and 324 are disposed through the fixed clamp portion 204. After the base 206 is adjusted to the proper height when the dummy strip of IC packages 304 touches the respective height adjustment jig 314, a first screw 326 is used to fix the left portion of the base 206 to the fixed clamp portion 204, and a second screw 328 is used to fix the right portion of the base 206 to the fixed clamp portion 204.

Figure 11:
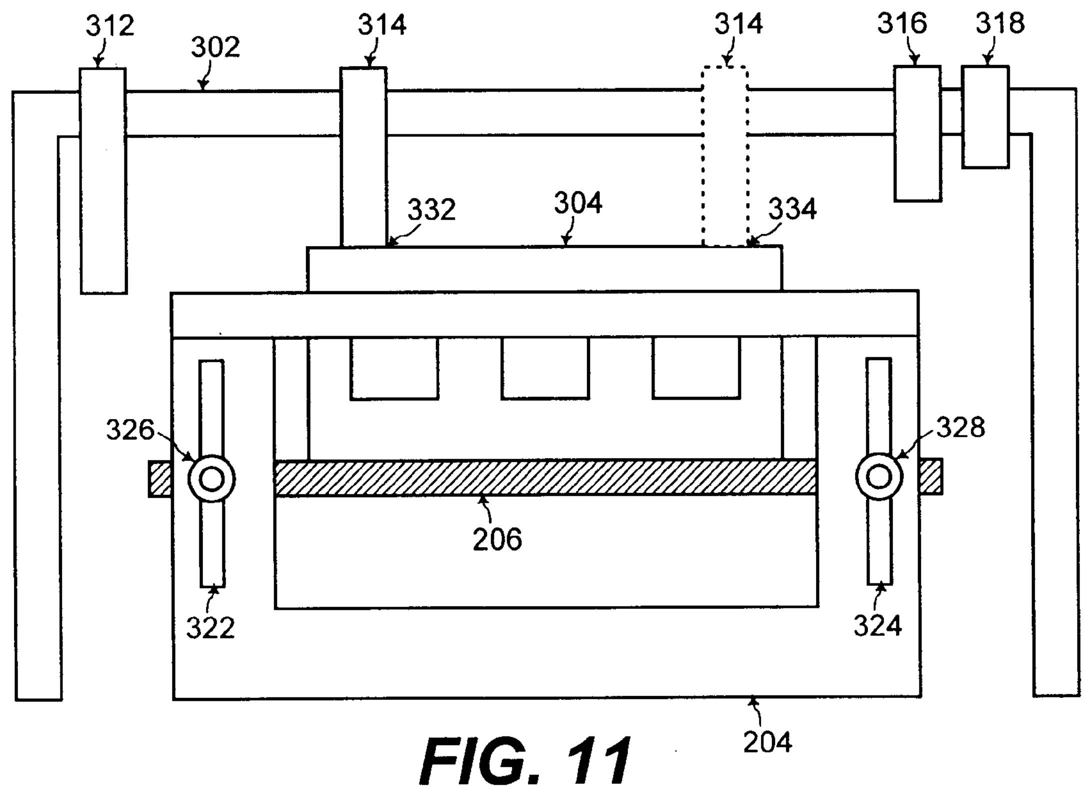

Referring to FIG. 11, for accurate adjustment of the base 206 to the proper height, the respective height adjustment jig 314 is slid along the length of the base 206 of the clamp for a plurality of locations (including a first location 332 and a second location 334 in FIG. 11). The height of the left portion and the right portion of the base 206 of the clamp is adjusted until the dummy strip of IC packages 304 touches the respective height adjustment jig 314 for each of the plurality of locations of the respective height adjustment jig 314. Such adjustment of the height of the base 206 for the plurality of locations of the respective height adjustment jig 314 ensures that the base 206 is accurately adjusted to the proper height.

In this manner, the proper height of the base 206 of the clamp is efficiently adjusted by fitting the dummy strip of IC packages between the respective height adjustment jig 314 and the base 206 of the clamp for any of a plurality of sizes of the strip of IC packages. Metric scales of the prior art which are prone to human error are not used with the present invention when setting the proper height of the base for the plurality of sizes of the strip of IC packages.

The foregoing is by way of example only and is not intended to be limiting. For example, the present invention is described for a clamp within an on-loader section of a solder plating machine for soldering leads of IC packages of a strip of IC packages. However, the present invention may be used for clamps in other types of machines for manufacture of IC packages, as would be apparent to one of ordinary skill in the art of IC package manufacture from the description herein.

Furthermore, as will be understood by those skilled in the art, the structures described herein may be made or used in the same way regardless of their position and orientation. Accordingly, it is to be understood that terms and phrases such as "length," "over," "left," "right," and "on" as used herein refer to relative location and orientation of various portions of the structures with respect to one another, and are not intended to suggest that any particular absolute orientation with respect to external objects is necessary or required. In addition, any materials mentioned herein are by way of example only.

The present invention is limited only as defined in the following claims and equivalents thereof.

We claim:

1. A method for adjusting a height of a base of a clamp to fit to strips of a plurality of IC (integrated circuit) package sizes, the clamp being comprised of a fixed clamp portion and said base having a height that is adjustable with respect to said fixed clamp portion, the method including the steps of:

placing a bar over said base of said clamp along a length of said base of said clamp, wherein said bar is fixed with respect to said fixed clamp portion;

placing a respective dummy strip of IC packages corresponding to a respective IC package size on said base of said clamp to be supported by said base of said clamp, wherein each of a plurality of dummy strips of IC packages corresponds to a respective IC package size;

sliding a respective height adjustment jig corresponding to said respective IC package size along said bar to be disposed over said respective dummy strip of IC packages, wherein each of a plurality of height adjustment jigs disposed on said bar has a respective fixed size corresponding to a strip of a respective IC package size; and raising said base of said clamp with respect to said fixed clamp portion toward said respective height adjustment jig until said respective dummy strip of IC packages touches said respective height adjustment jig at a proper height of said base of said clamp.

2. The method of claim 1, further including the step of:

sliding said base along guide slots disposed on said fixed clamp portion as the height of said base is adjusted.

3. The method of claim 1, further including the step of:

fixing said base of said clamp to said fixed clamp portion at said proper height after said base has been raised until said respective dummy strip of IC packages touches said respective height adjustment jig.

4. The method of claim 1, wherein said clamp is part of a mechanism for loading strips of IC packages onto a carrier belt in a solder plating machine for soldering lads of said IC packages.

5. The method of claim 1, further including the step of:

sliding said respective height adjustment jig along said bar to each of a plurality of locations along the length of said base to adjust said height of said base for said plurality of locations along the length of said base until said respective dummy strip of IC packages touches said respective height adjustment jig at each of said plurality of locations along the length of said base.

6. A method for adjusting a height of a base of a clamp to fit to strips of a plurality of IC (integrated circuit) package sizes, the clamp being comprised of a fixed clamp portion and said base having a height that is adjustable with respect to said fixed clamp portion, the method including the steps of:

placing a bar over said base of said clamp along a length of said base of said clamp, wherein said bar is fixed with respect to said fixed clamp portion;

placing a respective dummy strip of IC packages corresponding to a respective IC package size on said base of said clamp to be supported by said base of said clamp, wherein each of a plurality of dummy strips of IC packages corresponds to a respective IC package size;

sliding a respective height adjustment jig corresponding to said respective IC package size along said bar to be disposed over said respective dummy strip of IC packages, wherein each of a plurality of height adjustment jigs disposed on said bar has a respective fixed size corresponding to a strip of a respective IC package size;

raising said base of said clamp with respect to said fixed clamp portion toward said respective height adjustment jig until said respective dummy strip of IC packages touches said respective height adjustment jig at a proper height of said base of said clamp, wherein said base is slid along guide slots disposed on said fixed clamp portion as the height of said base is adjusted;

fixing said base of said clamp to said fixed clamp portion at said proper height after said base has been raised until said respective dummy strip of IC packages touches said respective height adjustment jig;

wherein said clamp is part of a mechanism for loading strips of IC packages onto a carrier belt in a solder plating machine for soldering leads of said IC packages; and sliding said respective height adjustment jig along said bar to each of a plurality of locations along the length of said base to adjust said height of said base for said plurality of locations along the length of said base until said respective dummy strip of IC packages touches said respective height adjustment jig at each of said plurality of locations along the length of said base.

* * * * *